(12) United States Patent
Parker et al.

(10) Patent No.: US 7,930,674 B2
(45) Date of Patent: Apr. 19, 2011

(54) MODIFYING INTEGRATED CIRCUIT DESIGNS TO ACHIEVE MULTIPLE OPERATING FREQUENCY TARGETS

(75) Inventors: James C. Parker, Zionsville, PA (US); Vishwas Rao, Breinigsville, PA (US)

(73) Assignee: Agere Systems Inc., Allentown, PA (US)

( * ) Notice: Subject to any disclaimer, the term of this patent is extended or adjusted under 35 U.S.C. 154(b) by 227 days.

(21) Appl. No.: 11/693,081

(22) Filed: Mar. 29, 2007

(65) Prior Publication Data
US 2008/0244473 A1 Oct. 2, 2008

(51) Int. Cl.
*G06F 17/50* (2006.01)
(52) U.S. Cl. ........................................................ 716/134
(58) Field of Classification Search .............. 716/1–18, 716/30–139
See application file for complete search history.

(56) References Cited

U.S. PATENT DOCUMENTS

| | | | |
|---|---|---|---|
| 5,764,525 A * | 6/1998 | Mahmood et al. | 716/18 |
| 5,903,471 A * | 5/1999 | Pullela et al. | 716/2 |
| 6,701,505 B1 | 3/2004 | Srinivasan | |
| 2004/0041228 A1 * | 3/2004 | Houston | 257/500 |
| 2004/0210857 A1 * | 10/2004 | Srinivasan | 716/2 |
| 2006/0150132 A1 * | 7/2006 | Gupta | 716/5 |
| 2007/0006109 A1 | 1/2007 | Bartling et al. | |

OTHER PUBLICATIONS

Kahng et al., "Impact of Gate-Length Biasing on Threshold-Voltage Selection", 7th International Symposium on Quality Electronic Design, Mar. 2006.*

* cited by examiner

*Primary Examiner* — Vuthe Siek
*Assistant Examiner* — Aric Lin
(74) *Attorney, Agent, or Firm* — Ryan, Mason & Lewis, LLP

(57) ABSTRACT

A first integrated circuit design with a first maximum operating frequency is modified to achieve a second integrated circuit design with a second maximum operating frequency. The integrated circuit design comprises an arrangement of cells. Each of these cells drives a signal that propagates through a net of other circuit elements to one or more nodes that are limited by respective signal timing constraints. An analytical cost function is assigned to each of the cells. Each analytical cost function comprises a value for its respective cell that is based on one or more speed-related factors indicative of the impact of the respective cell on the first maximum operating frequency of the first integrated circuit design. One or more of the cells are replaced with different cells based on the determined analytical cost functions.

21 Claims, 3 Drawing Sheets

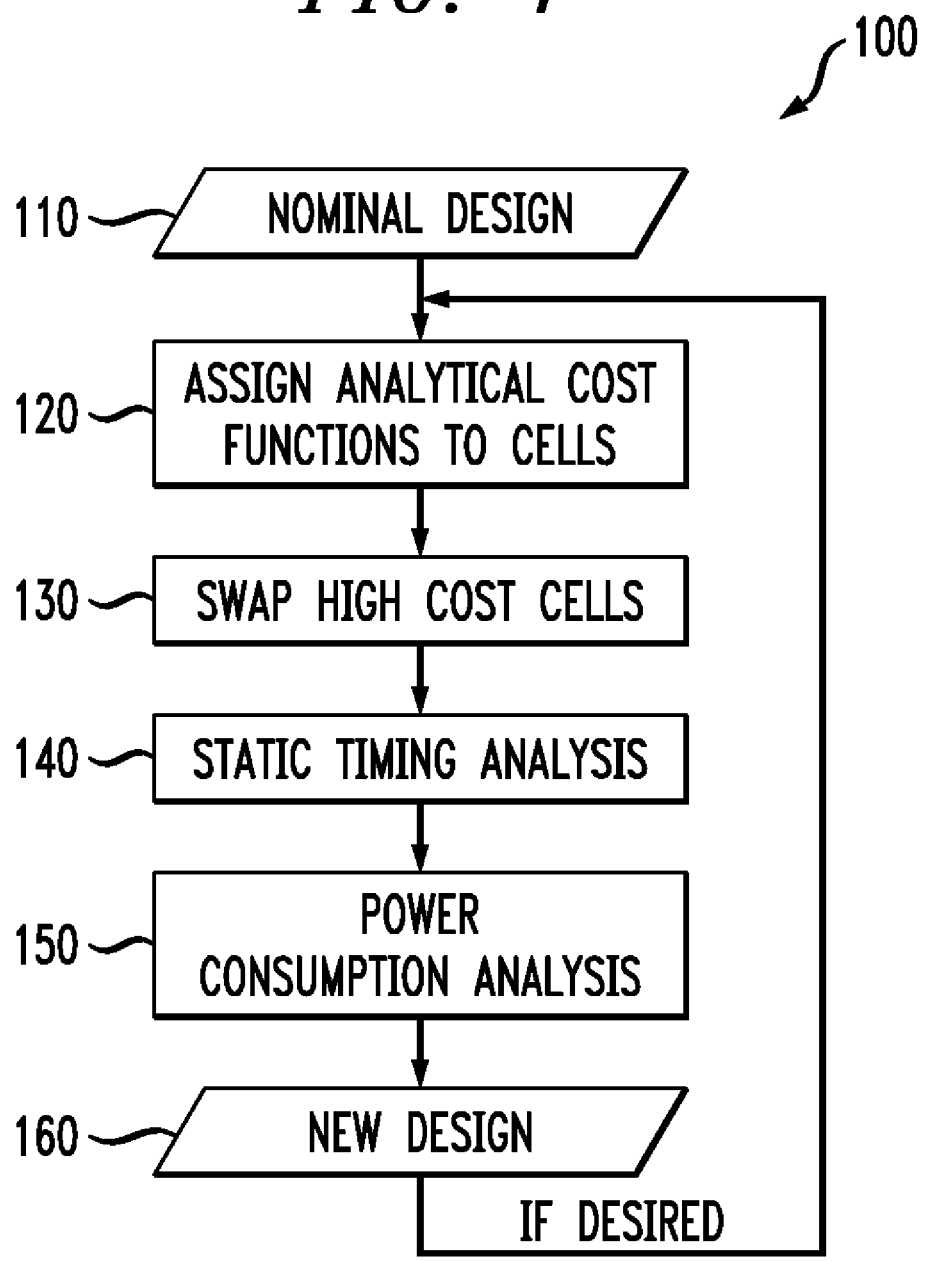

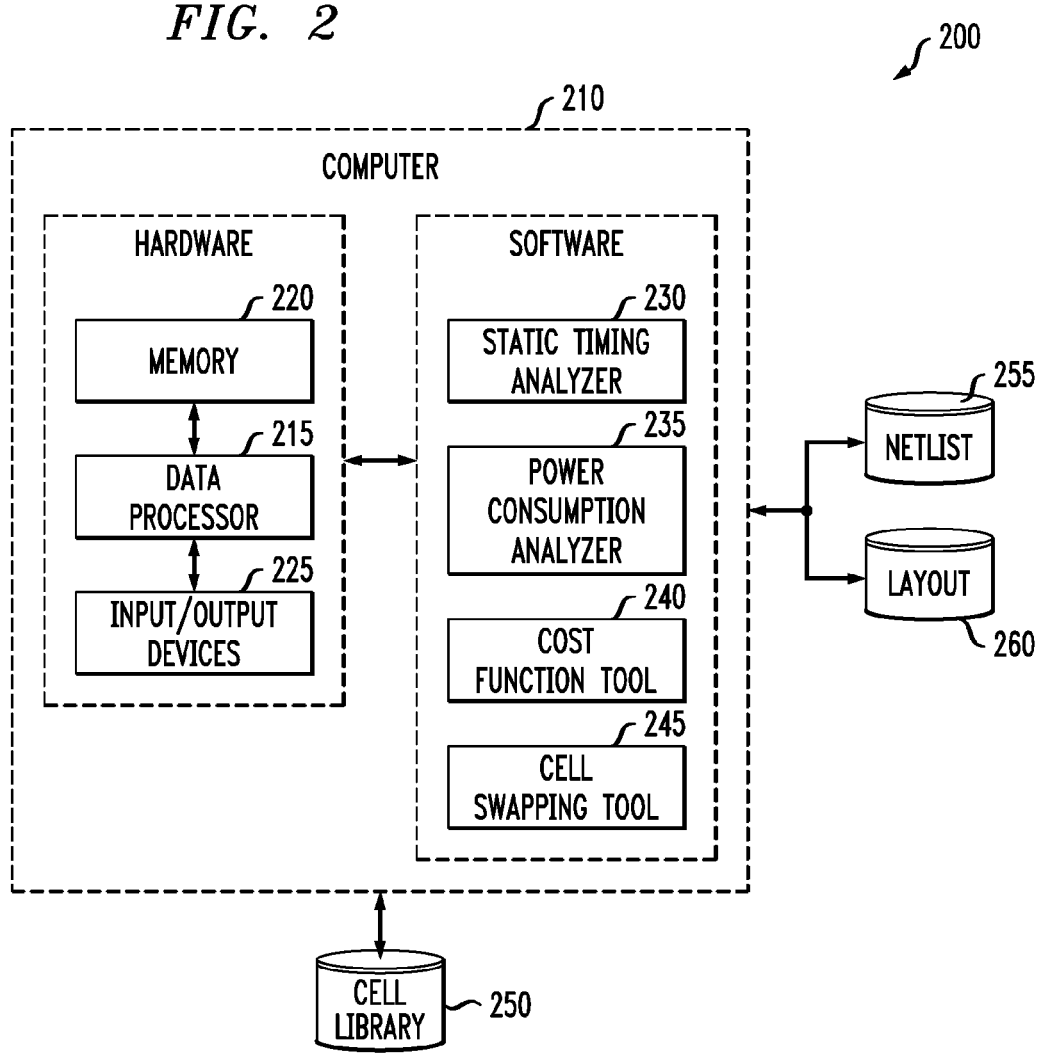

— 151.62MHz_Fixes=0
—·— 151.93MHz_Fixes=856
---- 156.42MHz_Fixes=1499
---- 160.21MHz_Fixes=1838
— — 164.72MHz_Fixes=2054

| CELL SWAP AND FREQUENCY ASSESSMENT | | | |
|---|---|---|---|
| NUMBER OF CELL SWAPS | WORST SETUP VIOLATION (ns) | NUMBER OF SETUP VIOLATIONS | MAXIMUM ACHIEVABLE FREQUENCY (MHz) |
| 0 | -1.996 | 13,580 | 151.620 |
| 856 | -1.982 | 12,829 | 151.930 |
| 1,499 | -1.793 | 12,751 | 156.421 |
| 1,838 | -1.642 | 12,487 | 160.205 |
| 2,054 | -1.471 | 12,485 | 164.718 |

MODIFYING INTEGRATED CIRCUIT DESIGNS TO ACHIEVE MULTIPLE OPERATING FREQUENCY TARGETS

FIELD OF THE INVENTION

The present invention is directed generally to integrated circuits, and, more particularly, to designing integrated circuits for multiple operating frequency targets.

BACKGROUND OF THE INVENTION

Integrated circuit designers must often balance several competing objectives when designing a new integrated circuit. One such tradeoff exists between integrated circuit speed (e.g., maximum operating frequency) and power consumption. The reason for this tradeoff can be best understood by recognizing that the great majority of semiconductor devices in a typical digital logic integrated circuit are metal-oxide-semiconductor field effect transistors (MOSFETs). As a result, the maximum operating frequency and the power consumption characteristics of an integrated circuit tend to strongly depend on the speed and the power consumption characteristics of the MOSFETs constituting that integrated circuit.

Both the speed and power consumption characteristics of MOSFETs are dependent on threshold voltage. The speed of a MOSFET, for example, can be increased by decreasing its threshold voltage, $V_t$. The circuit delay, $T_d$, of a MOSFET (i.e., the time that it takes a signal to propagate through the MOSFET) can be represented by:

$$T_d = C/(V_{dd}-V_t)^n,$$

where n is a number between 1 and 2 that indicates the deviation from the MOSFET square law due to velocity saturation, and c is a constant that depends upon the load capacitance, drive current, and supply voltage. The lower the threshold voltage, the shorter the circuit delay and the faster the MOSFET can be operated.

The power consumption, $P_m$, of a MOSFET in the off state, in contrast, can be approximated by:

$$P_m = V_{dd} * I_{st},$$

where $V_{dd}$ is the voltage applied to the MOSFET's drain and $I_{st}$ is the subthreshold leakage current for the transistor (i.e., the current flowing in the transistor when the transistor is in the off state). $I_{st}$ decreases exponentially with threshold voltage in accordance with:

$$I_{st} = I_0 * 10^{-Vt/s},$$

where $I_0$ is the current at $V_{gs}=V_t$, $V_{gs}$ is the voltage difference between the gate and the source, and s is the subthreshold slope (i.e., the slope of the change in device current with gate voltage while the device is off). In this case, the higher the threshold voltage, the lower the subthreshold leakage current and the lower the power consumption of the MOSFET.

Because of these opposed dependencies of MOSFET speed and power consumption on threshold voltage, integrated circuit designers usually must design an integrated circuit with a particular application in mind. When designing for a portable, battery operated device such as a cellular telephone or personal digital assistant, for example, a designer will frequently choose a frequency-power solution that sacrifices higher maximum operating frequency for lower power consumption. The designer may do so by incorporating MOSFETs with relatively high threshold voltages into the design. On the other hand, when designing an integrated circuit for a computer system with a ready supply of power, a designer may choose to do just the opposite and sacrifice lower power consumption for higher maximum operating frequency. Here, the designer may incorporate MOSFETs with relatively low threshold voltages. Unfortunately, once a solution is chosen and an integrated circuit design has been tailored to meet specific maximum operating frequency and power consumption requirements, that design is not easily modified to achieve different frequency-power requirements. Making such modifications using conventional integrated circuit design methods typically requires that several steps in the design process be repeated for the new design, including determining the placement of cells, the routing of wires, and new signal timing. There is, as a result, little portability between designs tailored to one frequency-power solution and designs tailored to a different solution.

For the foregoing reason, there is a need for a low-cost method for efficiently modifying integrated circuit designs to achieve new maximum operating frequency targets.

SUMMARY OF THE INVENTION

Embodiments of the present invention address the above-identified need by providing methods and apparatus for efficiently and cost-effectively modifying integrated circuit designs to achieve new maximum operating frequency targets.

In accordance with an aspect of the invention, a first integrated circuit design with a first maximum operating frequency is modified to achieve a second integrated circuit design with a second maximum operating frequency. The integrated circuit design comprises an arrangement of cells. Each of these cells drives a signal that propagates through a net of other circuit elements to one or more nodes that are limited by respective signal timing constraints. An analytical cost function is assigned to each of the cells. Each analytical cost function comprises a value for its respective cell that is based on one or more speed-related factors indicative of the impact of the respective cell on the first maximum operating frequency of the first integrated circuit design. One or more of the cells are replaced with different cells based on the determined analytical cost functions.

In accordance with one of the above-identified embodiments, a data processing system uses a novel design methodology to modify an existing integrated circuit design with nominal maximum operating frequency and power consumption characteristics to achieve a new integrated circuit design with different frequency-power characteristics. The data processing system uses a cost function tool in combination with static timing analysis to assign analytical cost functions to each of the cells within the nominal integrated circuit design. The analytical cost function for a particular cell is a function of various factors that may cause that cell to impact the speed of the integrated circuit as a whole. These factors may include, but are not limited to:

a) signal propagation delay of the particular cell;
   b) capacitive load acting on the particular cell;
   c) signal transition time on the net of other circuit elements driven by the particular cell;
   d) signal delay due to crosstalk on the net of other circuit elements driven by the particular cell;
   e) number of nodes not meeting their particular signal timing constraints that are driven by the particular cell; and f) distribution of times by which nodes not meeting their particular timing constraints that are driven by the particular cell miss their particular signal timing constraints.

Those cells with the highest analytical cost functions are subsequently replaced by faster cells. The new integrated circuit design is then evaluated to determine its maximum operating frequency and power consumption characteristics. If additional iterations of the integrated circuit design are desired, the methodology is repeated.

Advantageously, the use of analytical cost functions in the above embodiment provides a convenient and efficient method by which to choose which cells to replace in the integrated design to achieve a new integrated circuit with different maximum operating frequency and power consumption characteristics. Moreover, if slow cells are replaced with faster cells having the same areal dimensions and the same configurations of inputs and outputs as the cells they are replacing, the swapping of cells does not require that any wiring be re-routed when modifying the integrated circuit design, thereby saving substantial design time and its associated cost.

These and other features and advantages of the present invention will become apparent from the following detailed description which is to be read in conjunction with the accompanying drawings.

BRIEF DESCRIPTION OF THE DRAWINGS

FIG. 1 shows a flow diagram of a method for designing an integrated circuit in accordance with an illustrative embodiment of the invention.

FIG. 2 shows a block diagram of a data processing system for use in implementing the FIG. 1 method embodiment.

FIG. 3 shows a table of frequency-power solutions resulting from the FIG. 1 method embodiment.

DETAILED DESCRIPTION OF THE INVENTION

Figures 4, 5:
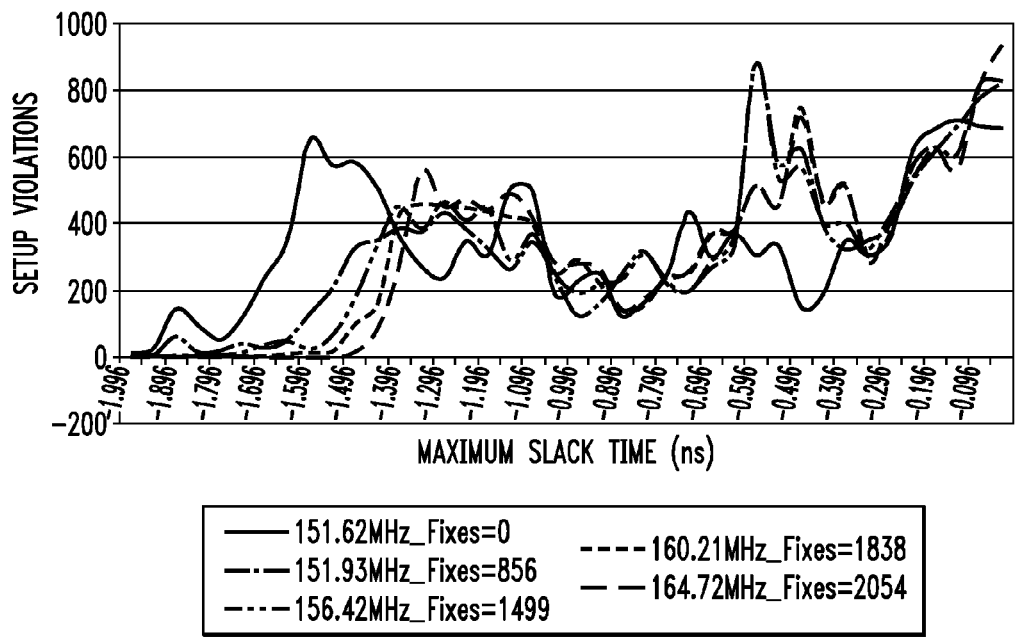
FIG. 4 shows a chart of the timing characteristics of an actual integrated circuit design resulting from applying the FIG. 1 method embodiment to the design.
FIG. 5 shows a table of the timing characteristics of an actual integrated circuit design resulting from applying the FIG. 1 method embodiment to the design.

The present invention will be described with reference to illustrative embodiments. For this reason, numerous modifications can be made to these embodiments and the results will still come within the scope of the invention. No limitations with respect to the specific embodiments described herein are intended or should be inferred.

FIG. 1 shows a flow diagram of an illustrative method 100 in accordance with aspects of the invention. This method allows an existing integrated circuit design to be modified to achieve new maximum operating frequency and power consumption targets. The method includes elements 110 through 160, each of which will be described in greater detail below. Advantageously, implementing methods in accordance with aspects of the invention allows integrated circuit designs to be modified in a low-cost and efficient manner when compared to conventional design modification techniques.

Because the illustrative method may be computationally demanding, the method 100 is preferably implemented in a data processing system. FIG. 2 is a block diagram showing an exemplary data processing system 200 for use in implementing the FIG. 1 method embodiment. The data processing system comprises a computer 210 with a data processor 215, a memory 220, and input/output devices 225. The term computer is to be construed broadly and may comprise, for example, a general-purpose computer, a workstation, a computer-aided design (CAD) terminal, or other processor-based device configured to implement at least a portion of the FIG. 1 method. The computer is operative to execute various software tools, namely, a static timing analyzer 230, a power consumption analyzer 235, a cost function tool 240, and a cell swapping tool 245. Moreover, the computer has access through its input/output devices to cell library data 250, netlist data 255, and layout data 260. Of course, this particular configuration of the data processing system is presented by way of example only, and numerous alternative arrangements can be used in implementing the invention.

As indicated by input 110 in FIG. 1, the illustrative method 100 for modifying an integrated circuit design starts with a functional integrated circuit design as an input. This integrated circuit design is characterized by nominal maximum operating frequency and power consumption characteristics. The subsequent steps in the illustrative method, steps 120-150, act to modify this nominal integrated circuit design to achieve a new maximum operating frequency and power consumption target.

The design of integrated circuits is conventionally performed and, as a result, will be familiar to one skilled in the art. Moreover, the design of integrated circuits is described in detail in several readily available publications, such as, for example L. Scheffer et al., *EDA for IC System Design, Verification and Testing*, CRC Press, 2006, which is incorporated herein by reference. By way of example, the design of integrated circuits may occur in the following manner. Initially, in a logic design phase, the user specification for the integrated circuit is converted into a register transfer level (RTL) design. The RTL design specifies how every element of the integrated circuit should act on every clock cycle. Next, in the physical design phase, the RTL design is converted into a physical layout that can be implemented in actual semiconductor hardware.

The physical design phase typically involves several sub-steps. In a synthesis step, a logic gate-level circuit description known as a "netlist" is created using a synthesis software tool such as, for example, Design Compiler Ultra from Synopsys® of Mountain View, Calif., USA. The synthesis tool selects the elements of the netlist from cells in a library in accordance with functional requirements and timing constraints provided by the designer. The cells in the library are typically designed to the requirements of a target manufacturing technology. Each cell is characterized to provide a table of output transition times (i.e., the time a digital signal takes to transition from low to high and vice versa) and a table of cell propagation delays (i.e., the time a signal takes to travel through the cell). The outputs of these tables depend on effective capacitive loads acting on the cell and input transition times of the cell.

Subsequently, the designer uses a "place and route" tool to initially place the cells of the netlist onto the upper region of a semiconductor die and to initially route wires to provide interconnections among these cells. The place and route tool may comprise, for example, software such as IC Compiler from Synopsys®. A placement library defines the layout rules for a specific process (e.g., the number of placements sites, the number of placement rows, and the orientation of the cells to be placed in the sites). The placement and routing tool typically attempts to place the cells to minimize wiring lengths and to minimize the area requirements of the resulting integrated circuit.

In general, the designer uses a static timing analyzer to perform a full timing analysis of the entire integrated circuit after initial placement and routing. The static timing analyzer may include, for example, software such as PrimeTime from Synopsys®. The static timing analyzer uses a technology library and the previously described output transition time and propagation delay tables in the cell library to perform the timing analysis. The technology library, for example, provides wire capacitance as a function of wire length for wires that interconnect the cells. If the length of a wire is known, then the effective capacitive load of the wire on a cell can be calculated. Once the effective capacitive load and the input transition time of a cell are known, then the output transition time and the propagation delay of that cell can be determined from the data in the cell library.

Static timing analysis software such as PrimeTime is also operative to determine signal delays resulting from crosstalk. As one skilled in the art will recognize, crosstalk occurs primarily as a result of capacitive coupling between signals on two nearby integrated circuit elements such as metallization features. The capacitive coupling may allow one signal to affect the timing of another signal. Crosstalk delays are frequently difficult to mitigate. Solutions may include increasing spacing and/or providing shielding between integrated circuit elements, and re-routing wiring.

The static timing analyzer provides the results of the timing analysis in terms of nodes along a timing path. Nodes are the input and output pins of combinational and sequential logic elements. A timing path is a signal path between a start node where a signal is launched in response to a clock signal, and an end node where the signal is latched in a sequential logic element (e.g., register) in response to a clock signal. The static timing analyzer determines and saves in memory for each node in the integrated circuit the input transition time, the output transition time, the minimum required time, the maximum required time, the minimum actual time, the maximum actual time, the worst minimum path slack, and the worst maximum path slack from a rising edge and a falling edge of a clock signal. The minimum actual time is the earliest time that a signal arrives at a node while the maximum actual time is the latest time that a signal arrives at the node. The worst minimum path slack is the difference of the minimum actual time from the minimum required time while the worst maximum path slack is the difference of the maximum required time from the maximum actual time.

A negative worst minimum path slack indicates a node with a min path violation. In other words, a signal arrives at a node from another node too early. Similarly, a negative worst maximum path slack indicates a max path violation. Here, the signal arrives at the node too late. The absolute value of a negative worst maximum path slack is also the amount of time by which a signal arrives late to a node and the amount of delay that must be removed for the signal to arrive before the end of the timing window.

Both min path and max path violations must be corrected for an integrated circuit design to function reliably. A late signal to a register (e.g., latch), for example, may cause the signal to not meet the register's setup time (i.e., the time that a signal must be in a valid state at the input of the register before a clock transition). This may cause erroneous data to be stored in the register. After determining such violations, additional software tools are frequently used to optimize the physical design of the integrated circuit to meet its timing constraints. Such software tools may again include, for example, IC Compiler from Synopsys®. Such optimization may include replacing cells, altering the distribution of the clock signal, and re-routing wiring.

In addition to analyzing signal timing within an integrated circuit design, the power consumption of an integrated circuit design is also determined to see if the design meets the specification for the integrated circuit. Software such as PrimeTime PX from Synopsys® is capable of performing this kind of power analysis. As indicated before, power consumption constraints for a given design are typically strongly dependent on the particular application for which the integrated circuit is to be utilized (e.g., whether the application is to be battery powered). Power consumption may also affect packaging decisions, form-factors, cooling requirements, and integrated circuit reliability.

Returning to FIGS. 1 and 2, it will be assumed for purposes of describing the implementation of the illustrative method 100 using the data processing system 200 that a functional integrated circuit design (the nominal integrated circuit design) has been formed using a methodology similar to that described above, including static timing analysis and power consumption analysis, and that this design is available as the input 110 to the illustrative method. It is preferred that the nominal integrated circuit design be designed using cells comprising MOSFETs having threshold voltages with absolute values that are relatively high. If this is the case, the nominal integrated circuit design will be characterized by a relatively low maximum operating frequency and low power consumption, which will allow modifications to these operating characteristics resulting from the application of the method to be more fully explored. It will be further assumed that the design's netlist and placement data are available to the computer 210 in netlist data 255 and layout data 260, respectively. Finally, it will also be assumed that the integrated circuit design's cell library is available to the computer in cell library 250.

In step 120, an analytical cost function is assigned by the computer 210 using the cost function tool 240 to each of the cells in the nominal integrated circuit design. An analytical cost function is a value that is a function of several relevant properties of a cell. In the present case, the relevant properties are those that help to determine the impact of a particular cell on the speed of the integrated circuit as a whole. Suitable factors may include, but are not limited to:
  a) signal propagation delay of the particular cell (PD);
  b) capacitive load acting on the particular cell (CL);
  c) signal transition time on the net of other circuit elements that is driven by the particular cell (ST);
  d) signal delay due to crosstalk on the net of other circuit elements that is driven by the particular cell (XD);
  e) number of nodes not meeting their particular timing constraints that are driven by the particular cell (NN); and
  f) distribution of times by which nodes not meeting their respective timing constraints that are driven by the particular cell miss their respective timing constraints (DN).

Each one of these factors can be determined using conventional static timing analysis like that described above (e.g., by using PrimeTime static analysis software).

An analytical cost function for a particular cell is preferably a single number, although any other suitable form of representation may be utilized (e.g., several numbers, colors, or letters). Moreover, the factors in an analytical cost function are preferably weighted in some manner to account for the relative impact of each factor on the speed of the integrated circuit. A suitable analytical cost function including all the above-described factors for a particular cell, $C_F(\text{cell})$, may be represented, for example, by:

$$C_F(\text{cell}) = (x_1 * PD) + (x_2 * CL) + (x_3 * ST) + (x_4 * XD) + (x_5 * NN) + (x_6 * DN),$$

where $x_1, x_2, \ldots, x_6$ represent the weights associated with each factor in the analytical cost function. The weighting of the different factors in such a function is preferably based on the particular technology used to form the integrated circuit. Suitable weighting factors for a given analytical cost function and integrated circuit technology will be evident to one skilled in the art. An illustrative weight assignment may involve, for example, assigning $x_1=1$, $x_2=1.1$, $x_3=1.5$, $x_4=0.8$, $x_5=1$, and $x_6=1$. With this particularly weighting, the transition time of the signal, ST, is weighted the highest (i.e., 1.5), while the delay due to crosstalk, XD, is weighted the lowest (i.e. 0.8). This assignment may indicate that that, because of the integrated circuit technology being utilized, the particular integrated circuit being modified is not very sensitive to crosstalk delay.

It is noted that the above formula for an analytical cost function is merely illustrative and many other function may be utilized and would still come within the scope of this invention. Rather than being a simple sum of weighted factors, the formula may, for example, involve higher powers of the factors or any other functional form that yields an analytical cost function that is indicative of each cell's contribution to the speed of the integrated circuit. It is preferred, but not necessary, that analytical cost functions be assigned to each one of the cells in a particular design. To save computational resources, however, it may be beneficial to determine analytical cost functions only for those cells that lie along a critical path within the integrated circuit (e.g., those cells that lie along a path between an input and an output with a relatively large signal delay).

In order to modify the maximum operating frequency of the nominal integrated circuit design, some of the cells within this design are replaced with faster cells. Advantageously, those cells with the highest analytical cost functions are the best candidates for replacement in this manner because these cells have the largest impact on the speed of the integrated circuit as a whole. The use of analytical cost functions therefore provides a convenient and efficient method by which to choose which cells to replace in a design to achieve a new design with a different frequency-power solution.

In step 130 of the illustrative method 100, the computer 210 determines which cells within the nominal integrated circuit design have the highest analytical cost functions. The computer then uses the cell swapping tool 245 to replace some number of these high cost cells with faster cells from the cell library 250. The faster cells comprise MOSFETs with threshold voltages having absolute values lower than those of the cells they are replacing. Moreover, the faster cells used to replace the slower cells preferably have the same areal dimensions and configuration of input and outputs as the cells they are replacing. Keeping the physical dimensions and input/output configuration consistent between slower and faster cells precludes the need to change routing every time a cell swap occurs. Efforts expended on the modification of a design are thereby greatly reduced.

As will be described below, the cell swapping process may be performed multiple times to produce several iterations of the integrated circuit design with different frequency-power solutions. The particular number of cells swapped in the step 130 is dependent on how fine a difference between iterations the designer wishes to produce. The smaller the number of cell swaps, the smaller the difference in maximum operating frequency and power consumption between consecutive modifications. A fine determination of frequency-power solutions may be accomplished by swapping, for example, 500-1,000 cells each time step 130 is performed. After making the cell swaps, any changes to the netlist and placement of cells in the integrated circuit design are stored in the netlist data 255 and in the layout data 260, respectively.

In step 140, the computer 210 performs conventional static timing analysis on the modified integrated circuit design using the static timing analyzer 230. In step 150, the computer also performs conventional power consumption analysis using the power consumption analyzer 235. Both forms of analysis act to determine maximum operating frequency and power consumption characteristics for the newly modified integrated circuit. This information is provided at output 160.

If the designer desires additional frequency-power solutions for the integrated circuit design, the computer may be caused to return to step 120 after output 160, where the cost function tool 240 is made to calculate analytical cost functions for cells within the modified integrated circuit. Each pass through steps 120-150 produces a new iteration of the integrated circuit design with a new frequency-power solution. Several passes through the method may be used to form a table like that shown in FIG. 3. This table shows maximum operating frequency and power consumption as a function of the number of cell swaps. As discussed earlier, the maximum operating frequency and power consumption will both tend to increase with the number of cell swaps. Advantageously, such a table makes it very easy for the designer to choose a design iteration with a suitable frequency-power solution for a particular application. Whatever design iteration is finally chosen, moreover, is readily available for use in manufacturing integrated circuit hardware.

FIGS. 4 and 5 help to describe the application of the method 100 to an actual integrated circuit design. The method was used to determine what range of maximum operating frequency and power consumption solutions were available from a particular nominal integrated circuit design. The integrated circuit design comprised about 400,000 cells.

FIG. 4 shows a chart of the number of timing violations (setup violations) as a function of maximum slack time for five iterations of the integrated circuit design. The number of cell swaps as well as the maximum achievable operating frequency is indicated in the legend for each design iteration. In determining the data in the chart, the maximum required times of various critical nodes within the integrated circuit design were artificially shortened by a fixed amount in order to induce violations. Using this artificial means of inducing violations allows the data in the chart to reflect the amount of timing margin available for each design iteration.

The table in FIG. 5 shows data similar to that presented in the chart in FIG. 4. The table shows the worst setup violation in nanoseconds (ns), number of setup violations, and maximum achievable operating frequency as a function of the number of cell swaps. The number of setup violations is determined by integrating under the associated curve shown in the chart in FIG. 4.

FIGS. 4 and 5 show that the nominal integrated circuit design without any cell swaps was able to operate at 151.62 megahertz (MHz). However, by making a relatively small number of cell swaps, the maximum operating frequency was substantially increased. With just 1,499 cell swaps, for example, it was possible to operate the integrated circuit at 156.42 MHz, while 2,054 cell swaps allowed the integrated circuit to achieve a maximum operating frequency of 164.72 MHz. What is more, as cell swaps increased, the timing margin against max path violations also increased. Power consumption did not change significantly for the different iterations of the integrated circuit design because of the small fraction of swapped cells. As a result, modifying the integrated circuit design using methods in accordance with aspects of this invention was extremely successful. The method allowed a substantially faster integrated circuit design with better timing margins to be achieved with very little redesign effort and cost.

As indicated earlier, aspects of this invention may be implemented using data processing systems. Machine-readable media (e.g., optical storage media, magnetic storage media, etc.) comprising programs operative to cause a data processing system to execute aspects of the invention are therefore considered part of this invention.

It should again be emphasized that, although illustrative embodiments of the present invention have been described herein with reference to the accompanying figures, the invention is not limited to those precise embodiments. One skilled in the art will recognize these various other changes and modifications that may be made without departing from the scope of the appended claims.

What is claimed is:

1. A method of modifying a first integrated circuit design with a first maximum operating frequency to achieve a second integrated circuit design with a second maximum operating frequency, the first integrated circuit design comprising an arrangement of a plurality of cells, each of the plurality of cells driving a respective signal through a net of other circuit elements to one or more nodes limited by respective signal timing constraints, the method comprising the steps of:
    assigning analytical cost functions to respective ones of the plurality of cells, each analytical cost function comprising a value for its respective cell that is based on one or more speed-related factors indicative of the impact of the respective cell on the first maximum operating frequency of the first integrated circuit design; and
    replacing one or more of the plurality of cells with different cells based on the determined analytical cost functions;
    each of the first and second integrated circuit designs comprising a physical layout of its corresponding cells;
    at least a given one of the analytical cost functions comprising a value that is based on a weighted combination of at least two speed-related factors using respective unequal weights, said at least two speed-related factors including at least one factor other than propagation delay, signal transition time and capacitive load, said at least one factor comprising signal delay due to crosstalk on the net of other circuit elements driven by the respective cell;
    wherein the assigning and replacing steps are applied to the physical layout of the first integrated circuit design and are implemented in a data processing system comprising a memory and a data processor coupled to the memory;
    the method further comprising the step of transforming the second integrated circuit design into integrated circuit hardware.

2. The method of claim 1, wherein the one or more speed-related factors comprise at least one of the following:
    number of nodes not meeting their respective signal timing constraints that are driven by the respective cell; and
    distribution of times by which nodes not meeting their respective timing constraints that are driven by the respective cell miss their respective signal timing constraints.

3. The method of claim 1, wherein each analytical cost function comprises a value that is based on a linear combination of at least two speed-related factors.

4. The method of claim 3, wherein the at least two speed-related factors are weighted relative to one another when determining the analytical cost functions.

5. The method of claim 1, wherein the one or more speed-related factors are determined by static timing analysis.

6. The method of claim 1, wherein a cell that is replaced in the replacing step is replaced by a different cell with the same areal dimensions as the cell being replaced.

7. The method of claim 1, wherein a cell that is replaced in the replacing step is replaced by a different cell with the same configuration of inputs and outputs as the cell being replaced.

8. The method of claim 1, wherein a cell that is replaced in the replacing step is replaced by a different cell with a different set of threshold voltages from the cell being replaced.

9. The method of claim 1, wherein at least one of the one or more nodes driven by each of the plurality of cells and limited by respective signal timing constraints comprises an input or an output of a sequential logic element.

10. The method of claim 9, wherein the signal timing constraint on the at least one of the one or more nodes is determined by at least one of a setup time and a hold time of the sequential logic element.

11. The method of claim 1 wherein the analytical cost function is non-linear in one or more of the speed-related factors.

12. An article of manufacture comprising a machine-readable storage medium storing one or more programs for use in modifying a first integrated circuit design with a first maximum operating frequency to achieve a second integrated circuit design with a second maximum operating frequency, the first integrated circuit design comprising an arrangement of a plurality of cells, each of the plurality of cells driving a respective signal through a net of other circuit elements to one or more nodes limited by respective signal timing constraints, the one or more programs operative to cause a data processing system comprising a memory and a data processor coupled to the memory to execute at least the steps of:
    assigning analytical cost functions to respective ones of the plurality of cells, each analytical cost function comprising a value for its respective cell that is based on one or more speed-related factors indicative of the impact of the respective cell on the first maximum operating frequency of the first integrated circuit design; and
    replacing one or more of the plurality of cells with different cells based on the determined analytical cost functions;
    each of the first and second integrated circuit designs comprising a physical layout of its corresponding cells;
    wherein the assigning and replacing steps are applied to the physical layout of the first integrated circuit design;
    at least a given one of the analytical cost functions comprising a value that is based on a weighted combination of at least two speed-related factors using respective unequal weights, said at least two speed-related factors including at least one factor other than propagation delay, signal transition time and capacitive load, said at least one factor comprising signal delay due to crosstalk on the net of other circuit elements driven by the respective cell.

13. A data processing system comprising a memory and a data processor coupled to the memory for modifying a first integrated circuit design with a first maximum operating frequency to achieve a second integrated circuit design with a second maximum operating frequency, the first integrated circuit design comprising an arrangement of a plurality of cells, each of the plurality of cells driving a respective signal through a net of other circuit elements to one or more nodes limited by respective signal timing constraints, the data processing system operative to perform the steps of:

assigning analytical cost functions to respective ones of the plurality of cells, each analytical cost function comprising a value for its respective cell that is based on one or more speed-related factors indicative of the impact of the respective cell on the first maximum operating frequency of the first integrated circuit design; and replacing one or more of the plurality of cells with different cells based on the determined analytical cost functions;

each of the first and second integrated circuit designs comprising a physical layout of its corresponding cells;

wherein the assigning and replacing steps are applied to the physical layout of the first integrated circuit design;

at least a given one of the analytical cost functions comprising a value that is based on a weighted combination of at least two speed-related factors using respective unequal weights, said at least two speed-related factors including at least one factor other than propagation delay, signal transition time and capacitive load, said at least one factor comprising signal delay due to crosstalk on the net of other circuit elements driven by the respective cell.

14. The data processing system of claim 13, wherein the one or more speed-related factors comprise at least one of the following:

number of nodes not meeting their respective signal timing constraints that are driven by the respective cell; and distribution of times by which nodes not meeting their respective timing constraints that are driven by the respective cell miss their respective signal timing constraints.

15. The data processing system of claim 13, wherein the one or more speed-related factors are determined by static timing analysis.

16. The data processing system of claim 13, wherein the data processing system is further operative to perform the step of determining the power consumption of the integrated circuit during operation.

17. The data processing system of claim 13, wherein each analytical cost function comprises a value that is based on a linear combination of at least two speed-related factors.

18. The data processing system of claim 17, wherein the at least two speed-related factors are weighted relative to one another when determining the analytical cost functions.

19. The data processing system of claim 13, wherein a cell that is replaced in the replacing step is replaced by a different cell with the same areal dimensions as the cell being replaced.

20. The data processing system of claim 13, wherein a cell that is replaced in the replacing step is replaced by a different cell with the same configuration of inputs and outputs as the cell being replaced.

21. The data processing system of claim 13, wherein a cell that is replaced in the replacing step is replaced by a different cell with a different set of threshold voltages from the cell being replaced.

* * * * *